United States Patent [19]

Harrison

[11] Patent Number: 4,737,764
[45] Date of Patent: Apr. 12, 1988

[54] MODULAR FLOOR COVERING UNITS WITH BUILT-IN LIGHTING

[75] Inventor: John M. Harrison, Chattanooga, Tenn.

[73] Assignee: Collins & Aikman Corporation, New York, N.Y.

[21] Appl. No.: 869,001

[22] Filed: May 30, 1986

[51] Int. Cl.$^4$ ............................ E01F 9/00; G08B 25/00
[52] U.S. Cl. .................................. 340/114 R; 340/691;
340/332; 340/331; 340/286 M; 340/321;
340/958; 340/982; 362/153; 362/367; 40/547;
40/550
[58] Field of Search ................ 340/114 R, 114 B, 691,
340/332, 951, 958, 982, 82, 87, 115, 116, 117,
321, 331, 286 M, 286 R; 362/31, 32, 153, 147,
364, 365, 366, 367; 428/34, 38; 40/547, 550,
565, 546

[56] References Cited

U.S. PATENT DOCUMENTS

| 4,340,929 | 7/1982 | Konikoff et al. | 362/153 |
| 4,347,499 | 8/1982 | Burkman, Sr. et al. | 340/332 |

Primary Examiner—Donnie L. Crosland
Attorney, Agent, or Firm—Bell, Seltzer, Park & Gibson

[57] ABSTRACT

An apparatus for guiding the occupants of a structure along a path of travel within the structure is provided. The apparatus is comprised of modular floor covering units which are abuttingly arranged to cover the floor of the structure, with some of the units being signal units having a light-transmissive housing positioned in an opening therein, and having light-emitting means positioned in the housing. Power means are provided to energize the light-emitting means, and thereby provide a visually discernable pathway on the floor. The floor covering units preferably comprise carpet tiles, the light-transmissive housings are preferably formed of molded plastic and the light-emitting means are preferably light-emitting diodes.

34 Claims, 7 Drawing Sheets

MODULAR FLOOR COVERING UNITS WITH BUILT-IN LIGHTING

NATURE OF THE INVENTION

This invention relates to illuminable signal units generally, and particularly relates to modular floor covering signal units having electrical light-emitting means positioned therein.

BACKGROUND OF THE INVENTION

Modular floor coverings employing individual units such as carpet tiles have become the material of choice for finishing the floors and decks of a variety of structures. Such a floor covering is easy to install because of the small size of each modular unit, is easy to maintain because damaged units can be individually replaced, and allows ready access to electrical cables, conduits, plumbing, and other service areas beneath the floor. These features render modular floor coverings particularly useful in stationary structures having heavy pedestrian traffic, such as hospitals or modern office or hotel buildings, as well as on transportation structures such as ships, trains, buses, and aircraft.

In these types of structures it is often necessary to have a way to direct people into, out of, or from place to place within the structure. Such guide systems include emergency signals for rapidly directing the occupants of the structure out of the structure in the event of an emergency, as well as day-to-day guidance systems for efficiently directing pedestrian traffic within the structure.

A floor is an excellent location for such guide systems. Where complex traffic patterns exist, as in a hospital, color-coded stripes are commonly located in halls or corridors. In the case of emergency signals, floors have been recognized, as in U.S. Pat. No. 4,347,499 to Burkman, as a location which may be less obscured by smoke than locations on the walls or ceilings of the structure. However, insofar as this applicant is aware, a modular floor covering system in which some of the units have illuminable signal means incorporated therein, so that the floor covering system also serves as an occupant guide system, has not heretofore been provided. Such a system would be architecturally attractive, easy to install, and easy to maintain.

Accordingly, an object of the present invention is to provide a modular floor covering unit which provides an electrically energized, illuminable, visually discernible indicator.

Another object of the present invention is to provide a floor covering system for a structure which serves as a guide system for the occupants of the structure.

More particular objects of this invention are to provide a floor covering unit and a floor covering system, as described above, wherein the floor covering is carpet.

Still further objects are to provide such units and systems as a low voltage unit and system.

SUMMARY OF THE INVENTION

In accordance with the present invention, applicant herein provides a modular floor covering unit having electrical light-emitting means adapted to serve as a visual indicator incorporated therein. The modular unit comprises a body of substantial thickness having a generally planar upper surface, such as a carpet tile. The light-emitting means has portions positioned within the body of the modular unit and other portions positioned adjacent the upper surface of the body of the modular unit. These latter portions of the light-emitting means are visually discernable when the light-emitting means is energized.

In the preferred embodiment of the invention, the body of the floor covering unit has at least one opening therein open to the upper surface of the floor covering unit. A light-transmissive housing is positioned in the opening so as to be inset therein, and light-emitting means are positioned within the housing. Upper portions of the housing are adjacent the upper surface of the floor covering unit, and are readily visible when the light-emitting means is energized.

Floor covering units of the present invention may be used as individual decorative or informational units, or in an apparatus for guiding the occupants of a structure in a path of travel along the floor within the structure. An apparatus for guiding occupants comprises a plurality of abuttingly arranged modular floor covering units covering the floor of a structure, with at least some of the units being illuminable. The illuminable units are arranged in a predetermined pattern along the floor of the structure, with a power means electrically connected to the light-emitting means in the illuminable units, so that when the light-emitting means are energized a visually discernable pathway appears in the floor which can be followed by the occupants of the structure to a predetermined location in the structure.

BRIEF DESCRIPTION OF THE DRAWINGS

The foregoing and other objects, features and advantages of the invention will be made apparent from the following description of the preferred embodiments and the drawings, in which.

DETAILED DESCRIPTION OF THE INVENTION

Figures 1, 2:
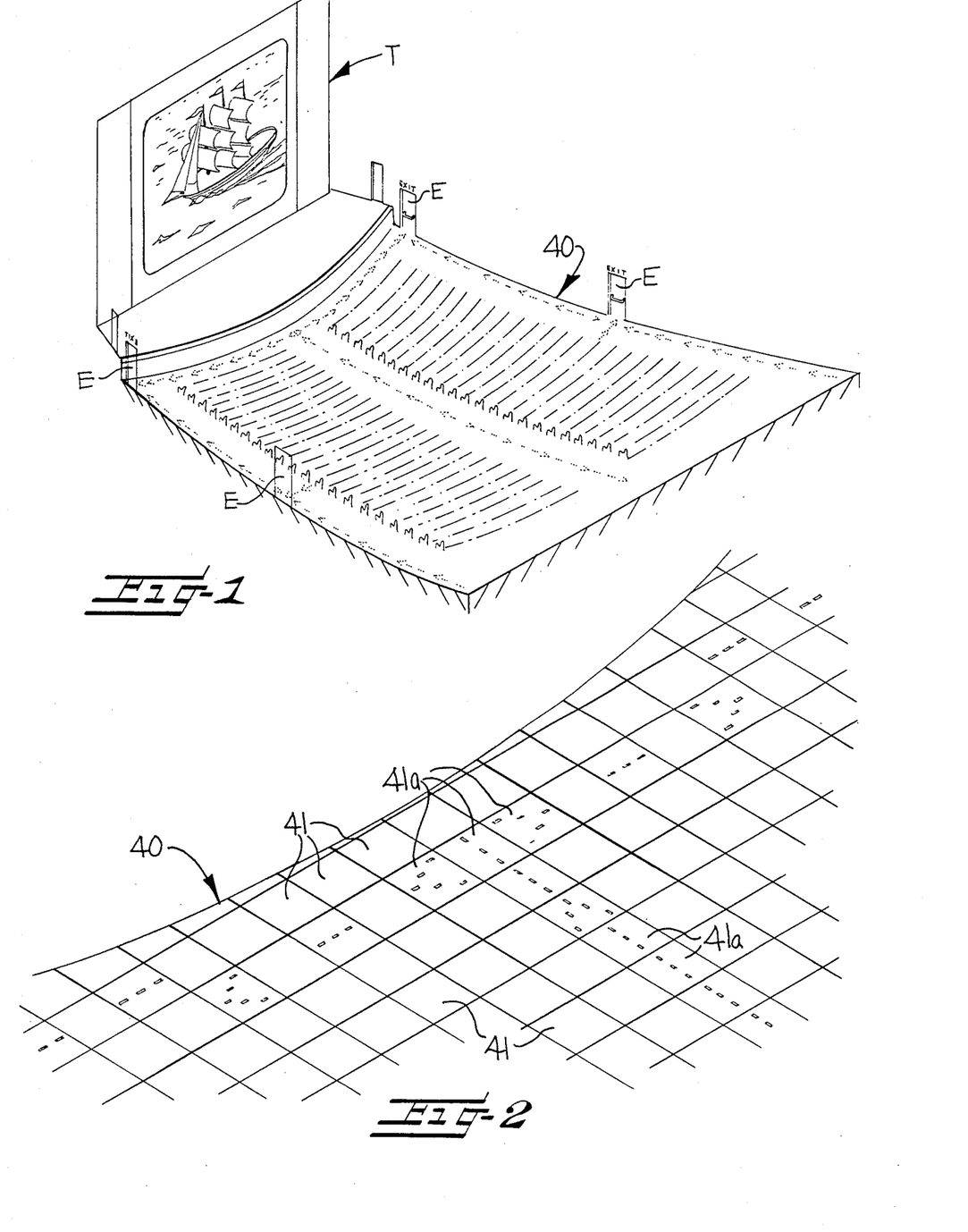
FIG. 1 is a perspective view of a theater structure in which an apparatus of the present invention is used to guide the occupants of the theater to exit doors.
FIG. 2 is a detailed view of the apparatus of FIG. 1.

FIGS. 1 and 2 illustrate the use of an apparatus 40 of the present invention for guiding the occupants of a structure such as a theater T to emergency exit doors E. The apparatus comprises a plurality of modular floor covering units 41 which are abuttingly arranged to cover the floor of the structure. Some of the units are illuminable units and designated 41a which are arranged in a predetermined pattern so that, when energized, they will provide a visually discernable pathway that will guide the occupants of the structure to the emergency exits of the structure.

Figures 3, 4:
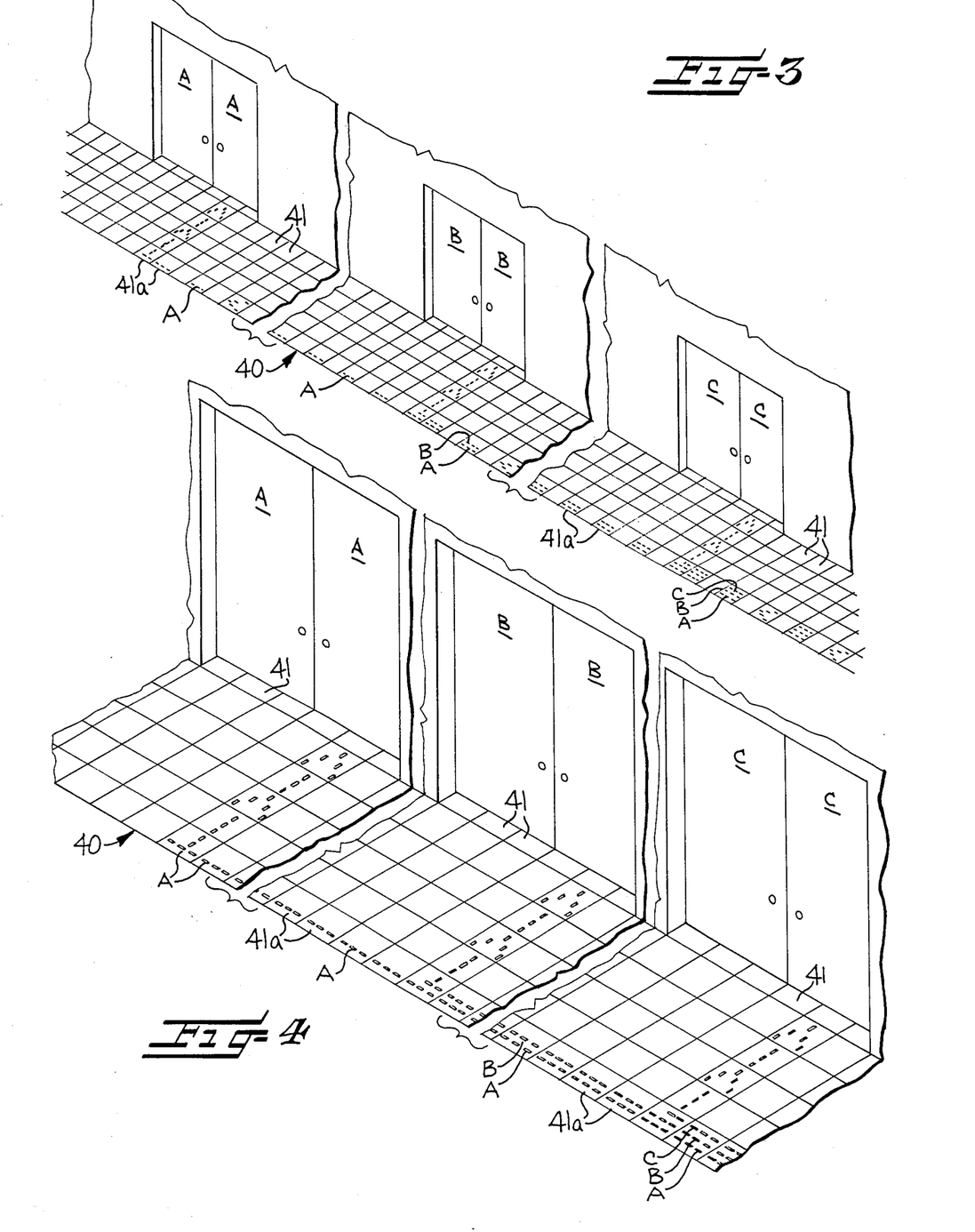
FIG. 3 illustrates the hallway of a structure such as a conference center in which the apparatus of the invention is used to guide the occupants of the structure to different rooms within the structure.
FIG. 4 is a detailed view of the apparatus of FIG. 3.

FIGS. 3 and 4 illustrate an apparatus of the present invention in a building, such as a hotel, which has a plurality of conference rooms arranged along a hallway therein. The apparatus is similar to the apparatus depicted in FIGS. 1 and 2, except that the illuminable floor covering units 41a are of a plurality of different illuminable colors, as will be explained in detail below. The illuminable units of this embodiment are so arranged that a different illuminable color designates a different path of travel (A, B or C) to each different conference room (A, B or C).

Figures 5, 6:
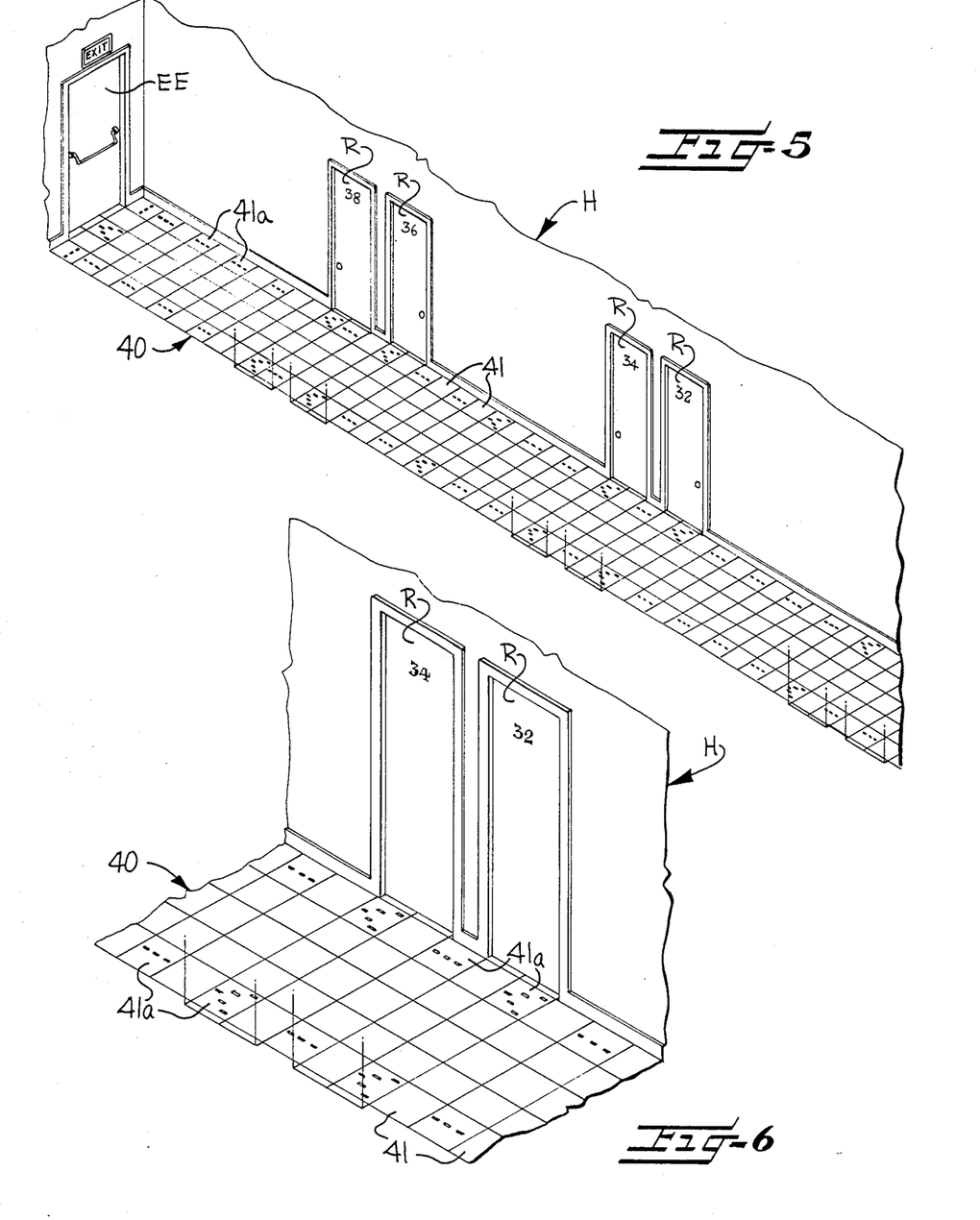
FIG. 5 is a perspective view of the hallway of a structure such as a hotel, in which an apparatus of the present invention is used to guide the occupants of individual rooms in the structure to an exit from the structure.
FIG. 6 is a detailed view of the apparatus illustrated in FIG. 5.

FIGS. 5 and 6 illustrate a still further embodiment of the present invention in a building such as a hotel H, which has a plurality of guest rooms R arranged along a hallway therein, and an emergency exit EE located nearby the guest rooms along the hallway. The illuminable units 41a are arranged in a predetermined pattern along the hallway to guide the occupants of the guest rooms to the emergency exit. When there are guest rooms arranged along opposite sides of the hallway, the illuminable floor covering units are arranged on each side of the hallway so that they are closely adjacent the thresholds of the doors of the guest rooms on both sides of the hallway. In the event of a fire, such a pattern will enable the occupants of each guest room to locate, on the floor in front of the threshold of the doorway to the room, the pathway to a predetermined emergency exit. Preferably, the illuminable units situated outside each doorway will indicate the direction of travel which the occupants should follow along the path.

Figures 7, 8, 9:
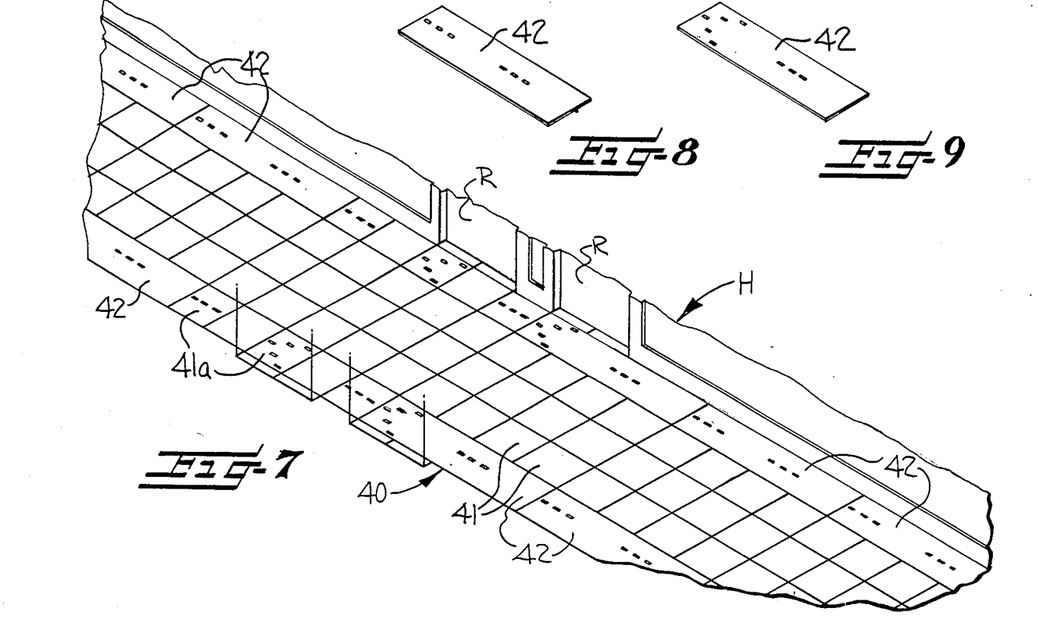
FIG. 7 is similar to FIG. 5, except that it illustrates the use of elongate border strips instead of squares as modular units.
FIGS. 8 through 15 illustrate various arrangements for light-transmissive housings in elongate modular units.

FIGS. 7 through 9 illustrate modular units of the present invention embodied in the form of elongate border units 42 having a width of only a fraction of the length thereof arranged along the side of a hallway. The border units can be used alone, or in combination with other sized modular units 41a as illustrated. In its broadest sense, a modular floor covering unit is any unit which is manufactured in a standard size without reference to a particular application, which is installed on a floor in abutting relation to other such units to form a floor covering, and which is provided in the form of a flat, unrolled unit (rather than rolled carpet).

Figure 10:
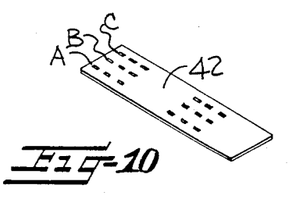
Figure 11:
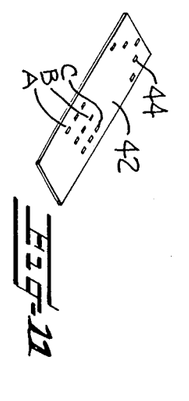
Figure 12:
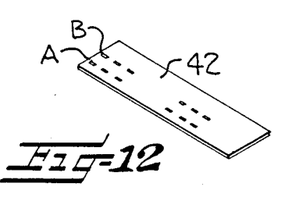
Figure 13:
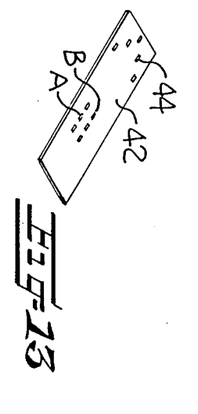
Figure 14:
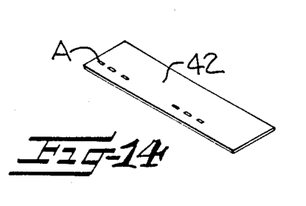
Figure 15:
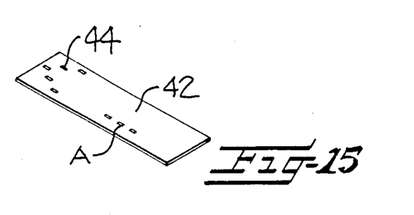

FIGS. 10 through 15 set forth a set of individual elongate modular units useful for forming the apparatus disclosed in FIGS. 3 and 4 above. Some units are provided with a directional indicator 44 (FIGS. 11, 13 and 15) while others are not. Some units provide a single path (A) of one color (FIG. 14), other units provide two paths (A and B) of two different colors (FIG. 12), and still other units provide three paths (A, B and C) of three different colors (FIG. 10).

Referring back to FIGS. 3 and 4, it will be seen that such a set of units may be assembled to provide different paths to different conference rooms (A, B and C). The number of paths which may be provided on any one modular unit is limited only by the number of paths which can be conveniently distinguished by eye.

The construction of individual illuminable modular units 41a is set forth in FIGS. 16, 17 and 20 to 25 in the form of a carpet tile 45. Each unit has at least one opening 46 therein which is open to the upper surface of the unit. A light transmissive housing 47 is inset in each opening. As will be explained below, each housing 47 contains at least one light emitting diode (LED) 53 which is electrically connected by flat cable 48 to an electrical union 49. When a tile 45 contains a plurality of paths of different colors, LED's 53 for each different path will be connected by cable to different electrical unions, with one union for each path on the tile. The housings 47 and electrical cable 48 are removably secured to the bottom surface of each unit with tape 50 so that the housing 47 can be easily removed during the repair of the unit. Individual LED's 53 are preferably connected in parallel, as illustrated in FIGS. 18 and 19, so that burnout of a single LED will not affect the remaining LED's.

Figures 18, 19, 20, 21, 22:
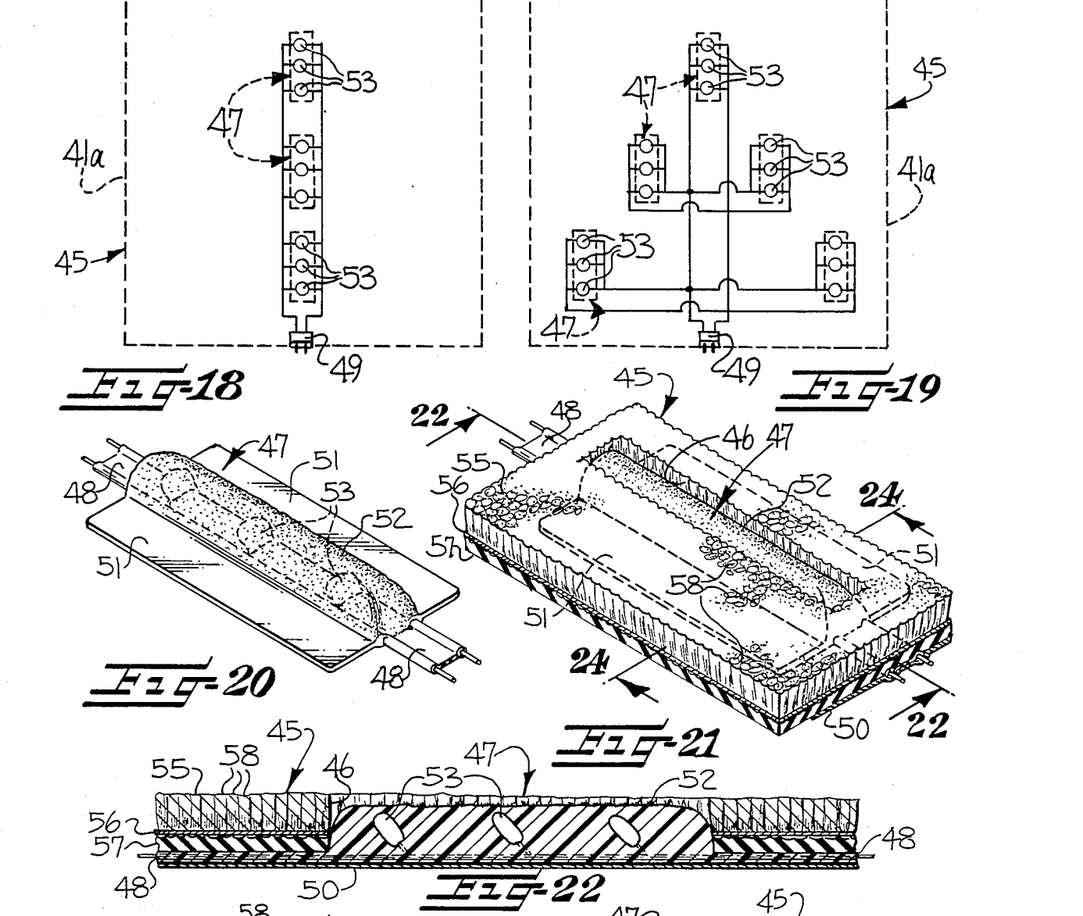
FIGS. 18 and 19 are wiring diagrams for the embodiments set forth in FIGS. 16 and 17, respectively.
FIG. 20 is a perspective view of the light-transmissive housing used in the embodiments of FIGS. 16 and 17, with light-emitting diodes installed therein.
FIG. 21 illustrates the light-emitting means of FIG. 20 in a carpet tile.
FIG. 22 is a sectional view, taken along line 22–22 of FIG. 21, of a light-transmissive housing inset into a carpet tile.

FIG. 20 illustrates in detail a light-transmissive housing 47. The housing is an integrally molded light transmissive member having flange portions 51 which extend outward from the bottom thereof. The flange portions serve to secure the housing into the carpet tile and prevent it from being pulled up through the opening in the modular unit into which the housing is inset (see FIG. 21). The housing has a top or dome portion 52 which is visible when the housing is installed in the floor covering unit (see FIG. 21).

Figure 23:
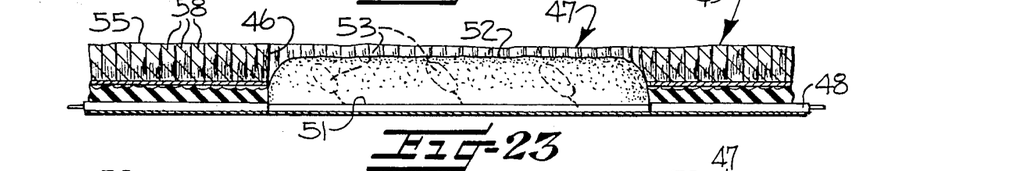
FIG. 23 is a sectional view similar to FIG. 22 but showing the light-transmissive housing in side elevation.

In FIGS. 22 and 23, it can be seen that the carpet tile 45 has pile tufts 58 defining a fibrous face 55, a primary backing 56 interconnecting the pile tufts, and a secondary backing 57 behind the primary backing for imparting dimensional stability to the carpet. The secondary backing is formed of resilient plastic material with a thickness substantially greater than the thickness of the primary backing. The fibrous face 55 is comprised of pile yarns forming the pile tufts 58, which tufts have lower portions which penetrate the primary backing 56, and which are engaged by the secondary backing 57. The carpet should desirably have relatively dense pile tufts so that the tufts surrounding the housing aid in receiving and spreading the weight of wheeled carts and persons walking across the housing to lessen any likelihood of damage to the housing.

The pile tufts 58 are preferably cut to permit them to blossom and expand: this will cause them to provide greater coverage across the face 55 of the carpet unit 45, and lessen any appearance of a gap alongside the housing inset into the opening 46 cut into the carpet unit. Preferably, the housing 47 is constructed of a material which is water and solvent impervious and sealably encases the LED's 53 enclosed therein and seals the union between the electrical cable 48 and the housing. The housing 47 should, moreover, be constructed of a high impact material which will protect the LED's 53 encased therein from being crushed.

The housing may be tinted to match or coordinate with the color of the carpet 45 so that the housing is desirably camouflaged in the carpet when not illuminated. In addition, the housing 47 desirably has a textured upper surface to diffuse light, and further aid in lessening the prominence of the housing in the carpet. If the carpet 45 is a carved or sculptured surface carpet with regions of high pile tufts and regions of low pile tufts, the housing can be further rendered less noticeable by positioning it in regions of low pile tufts. This will advantageously aid in concealing any difference in feel of the carpet to persons walking thereon caused by the solid nature of the housing.

Figure 24:
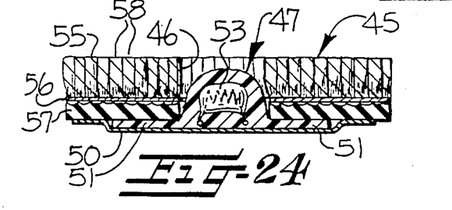
FIG. 24 is a transverse sectional view, taken along line 24—24 of FIG. 21, of a light-transmissive housing inset into a carpet tile.
Figure 25:
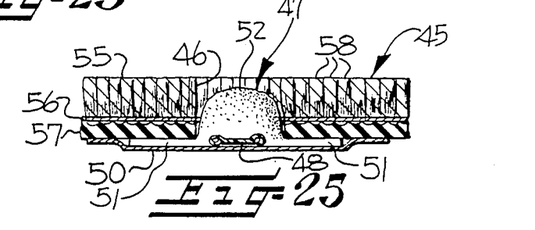
FIG. 25 is a sectional view similar to FIG. 24 but showing the light-transmissive housing in end elevation.
Figure 26:
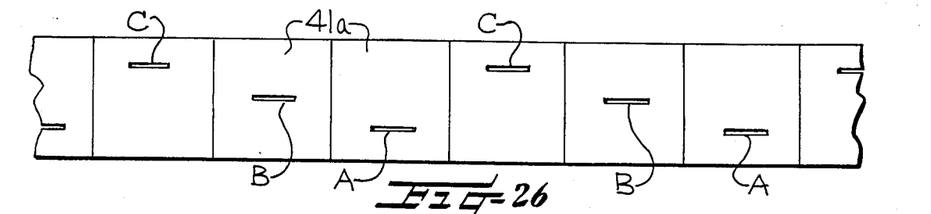
FIGS. 26–29 set forth exemplary arrangements for the lighted modular units.
Figure 27:
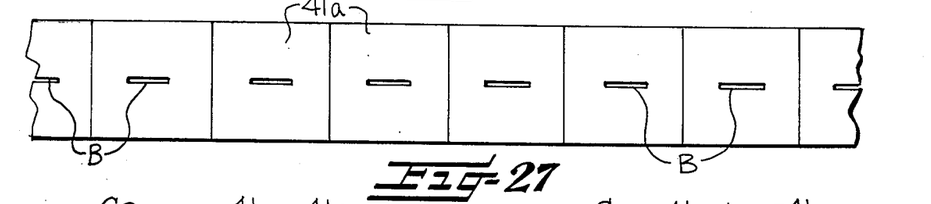

When the housing 47 is inserted into a carpet tile it should extend upwardly no higher than the surrounding pile tufts 58, and should preferably be recessed up to ⅛" from the surface or face 55 of the carpet, as seen in FIGS. 22 and 23. More particularly, the amount of the recess should be such that, when the surrounding carpet piles 58 are compressed by an average load, the top of the housing 47 will not protrude above the tops of the surrounding carpet piles. Turning to FIGS. 24 and 25, the top portion 52 of the light-transmissive housing desirably is rounded and has beveled or rounded end portions reduce the probability of heels catching on the housing, so that the chances of persons walking on the unit tripping thereon are minimized.

FIGS. 26 through 29 set forth various patterns in which the light-transmissive housings 47 can be arranged in floor covering units. Illuminable units can be arranged in abutting engagement (see FIG. 27) or out of abutting engagement (see FIG. 5) with nonilluminable units interspersed therebetween. For example, in FIGS. 5 and 6, one nonilluminable unit is positioned between each illuminable unit. This aids in lessening the number of illuminable units and thereby aiding in camouflaging the illuminable units on the floor. When a plurality of differing illuminable colors are desired (as may, for example, be required to define three separate paths A, B and C) each modular tile may provide some of the illuminable colors (see FIG. 26) or all of the illuminable colors (see FIG. 28). When the floor covering units are arranged to provide a path, the illuminable units may be arranged end-to-end (see FIG. 27) or may be separated by one or more nonilluminable units (see FIG. 29).

Figure 16:
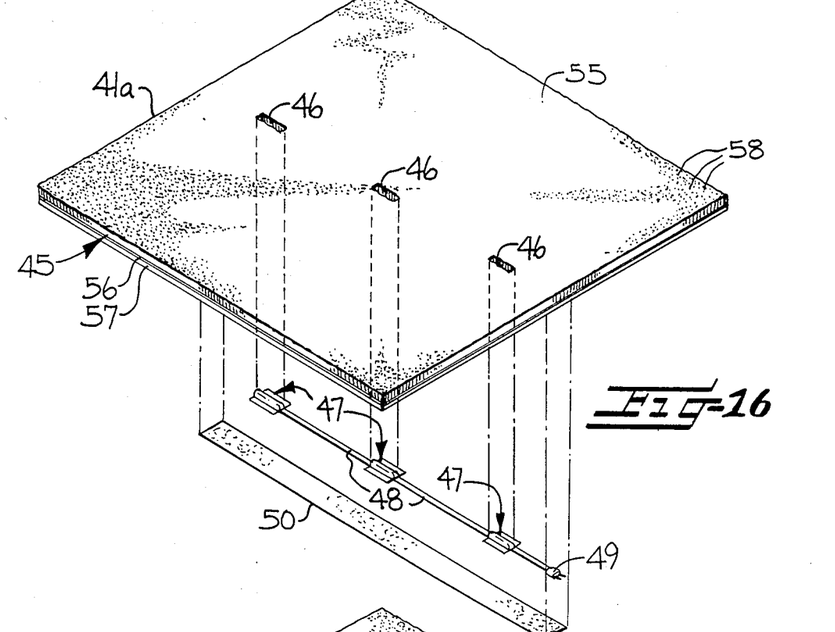
FIGS. 16 and 17 are exploded views of modular floor covering units of the present invention in the form of carpet tiles.
Figure 17:
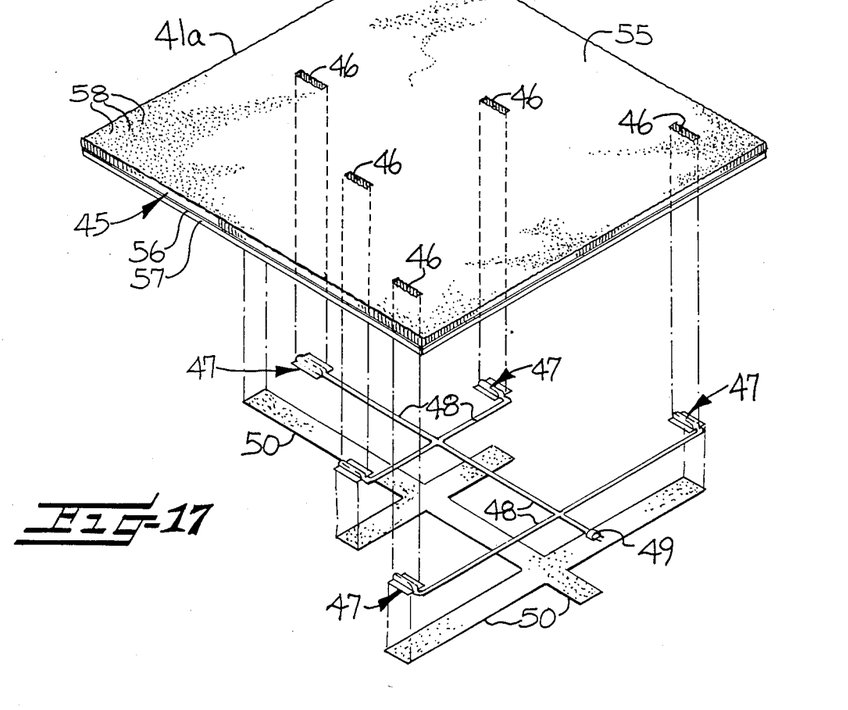
Figure 28:
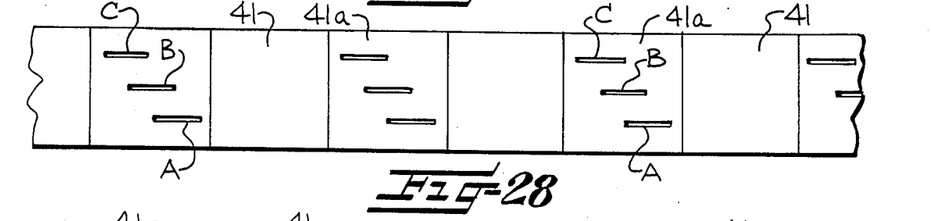
Figure 29:
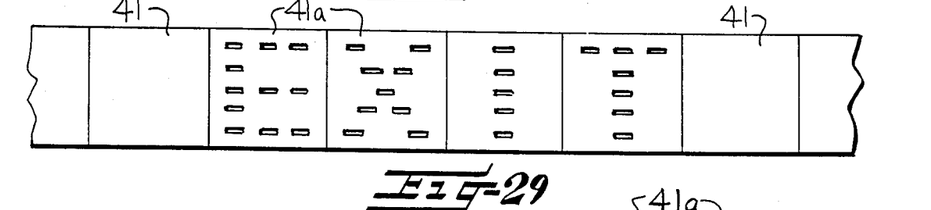

When the floor covering units contain a plurality of housings and light emitting means, as depicted in FIG. 28, the housings may be offset from one another to form a plurality of paths (A, B and C) or may be arranged in a single illuminable row to create a single path (see FIG. 16). When a floor covering unit contains housings 47 which are arranged in a plurality of rows to provide a floor covering with a plurality of paths (see FIGS. 3 and 4), the rows will desirably be substantially parallel, with each row providing a different color when illuminated.

Figure 30:
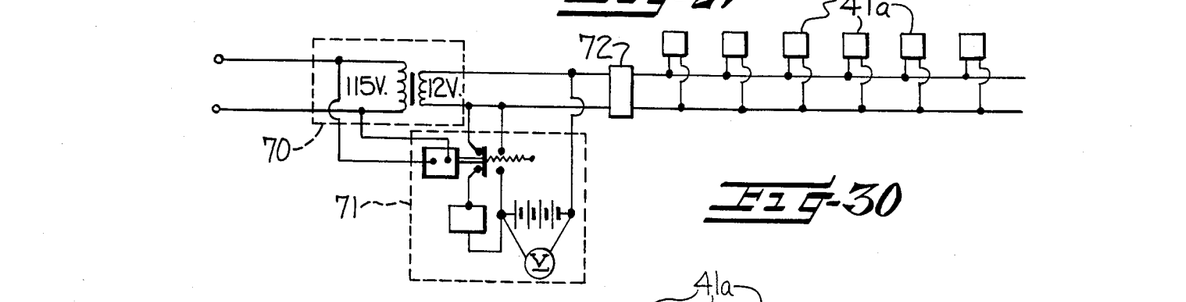
FIGS. 30 and 31 set forth exemplary wiring diagrams by which modular floor covering units of the present invention can be electrically arranged.
Figure 31:
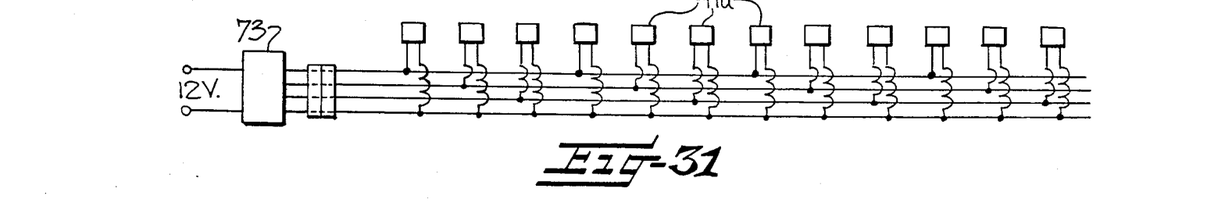

Turning to FIG. 30, a suitable electrical control system for a plurality of illuminable carpet tiles 41a comprises a low voltage power source 70, a battery-powered, back-up power source 71 and a control unit 72. The lower voltage power source is about 24 volts or under, and preferably 12 volts as illustrated for use with LEDs 53 as the light emitting means. The control unit can be simply a manual switch for turning a lighted path on and off, or an automatic switch such as a smoke detector for turning an emergency exit path on, automatically, in case of a fire. If desired, a pattern generator 73 (see FIG. 31) may be used when it is desired to pulse lights to create the appearance of moving lights flowing down a path on the floor.

In the drawings and specification, there has been disclosed typical preferred embodiments of the invention and, although specific terms are employed, they are used in a generic and descriptive sense only and not for purposes of limitation, the scope of the invention being set forth in the following claims.

That which is claimed is:

1. An apparatus for guiding the occupants of a structure in a path of travel along the floor within the structure, comprising a plurality of abuttingly arranged modular floor covering units covering the floor, said modular units having a fibrous face, some of said modular floor covering units being illuminable and arranged in a predetermined pattern resting upon and extending along the floor, each of said illuminable floor covering units having at least one relatively small opening therein spaced inwardly from the sides of said unit and open to the upper surface of the unit, a relatively small light transmissive housing positioned in each of said openings so as to be inset therein and completely surrounded by said fibrous face, light-emitting means positioned within each of said housings, and power means electrically connected to said light-emitting means of said illuminable modular floor covering units so that when said light-emitting means are energized by said power means a visually discernable pathway is defined in the floor by the cooperation of said illuminable modular floor covering units which can then be followed by the occupants of the structure to a predetermined location in the structure.

2. An apparatus according to claim 1 including electrical control means for energizing said light-emitting means in said illuminable floor covering units in a desired sequence.

3. An apparatus according to claim 1 wherein each of said illuminable floor covering units have a plurality of openings therein each containing one of said light-transmissive housings and a light-emitting means positioned within each of the housings.

4. An apparatus according to claim 3 wherein said plurality of housings and light-emitting means in each illuminable floor covering unit are arranged in a single row.

5. An apparatus according to claim 4 wherein said plurality of housings and light-emitting means in each illuminable floor covering unit are arranged in a plurality of substantially parallel rows.

6. An apparatus according to any one of claims 1, 2, 3, 4, or 5 wherein said illuminable floor covering units are of a plurality of differing illuminable colors and so arranged that a different illuminable color designates a path of travel to a different location in the structure.

7. An apparatus according to claim 1 wherein said predetermined pattern arrangement of said illuminable floor covering units comprises an elongate row of abuttingly engaging illuminable units.

8. An apparatus according to claim 1 wherein said predetermined pattern arrangement of said illuminable floor covering units comprises an elongate row of floor covering units wherein only some of the floor covering units in the row are illuminable units and the remaining floor covering units in the row are not illuminable.

9. An apparatus according to claim 1 wherein said predetermined pattern of said illuminable floor covering units comprises a row of floor covering units wherein only some of the units in the row are illuminable units, and wherein the illuminable units in the row are spaced apart from each other with at least one nonilluminable unit positioned between adjacent illuminable units.

10. An apparatus for guiding the occupants of a structure in a path of travel along the floor within the structure, comprising a plurality of abuttingly arranged modular floor covering units covering the floor, each of said modular floor covering units comprising a carpet tile having a fibrous face, some of said modular floor covering units being illuminable and arranged in a predetermined pattern resting upon and extending along the floor, each of said illuminable floor covering units having at least one relatively small opening therein spaced inwardly from the sides of said unit and open to the fibrous face of the carpet tile, an integrally molded relatively small light transmissive plastic housing positioned in each of said openings so as to be inset therein and completely surrounded by said fibrous face, light-emitting means molded within each of said housings, and power means electrically connected to said light-emitting means of said illuminable modular floor covering units so that when said light-emitting means are energized by said power means a visually discernable pathway is defined in the fibrous faces of the carpet tiles by the cooperation of said illuminable modular floor covering units which can then be followed by the occupants of the structure to a predetermined location in the structure.

11. An apparatus according to claim 10 including electrical control means for energizing said light-emitting means in said illuminable floor covering units in a desired sequence.

12. An apparatus according to claim 10 wherein each of said illuminable floor covering units have a plurality of openings therein each containing one of said light-transmissive housings and a light-emitting means positioned within each of the housings.

13. An apparatus according to claim 10 wherein said plurality of housings and light-emitting means in each illuminable floor covering unit are arranged in a single row.

14. An apparatus according to claim 13 wherein said plurality of housings and light-emitting means in each illuminable floor covering unit are arranged in a plurality of substantially parallel rows.

15. An apparatus according to any one of claims 10, 11, 12, 13 or 14 wherein said illuminable floor covering units are of a plurality of differing illuminable colors and so arranged that a different illuminable color designates a path of travel to a different location in the structure.

16. An apparatus according to claim 10 wherein said predetermined pattern arrangement of said illuminable floor covering units comprises an elongate row of abuttingly engaging illuminable units.

17. An apparatus according to claim 10 wherein said predetermined pattern arrangement of said illuminable floor covering units comprises an elongate row of floor covering units wherein only some of the floor covering units in the row are illuminable units and the remaining floor covering units in the row are not illuminable.

18. An apparatus according to claim 10 wherein said predetermined pattern of said illuminable floor covering units comprises a row of floor covering units wherein only some of the units in the row are illuminable units, and wherein the illuminable units in the row are spaced apart from each other with at least one non-illuminable unit positioned between adjacent illuminable units.

19. In combination with a building such as a hotel having a plurality of conference rooms arranged along a hallway therein, an apparatus for guiding the attendees of the conference in a path of travel along the hallway to a designated conference room, comprising a plurality of abuttingly arranged modular floor covering units covering the floor of the hallway, each of said modular floor covering units having a fibrous face, some of said modular floor covering units being illuminable and arranged in a predetermined pattern resting upon the floor and extending along the hallway to respective ones of said conference rooms, said illuminable floor covering units being of a plurality of differing illuminable colors and so arranged that a different illuminable color designates a path of travel to each respective conference room, each of said illuminable floor covering units having at least one relatively small opening therein spaced inwardly from the sides of said unit and open to the upper surface of the unit, a relatively small light transmissive housing positioned in each of said openings so as to be inset therein and completely surrounded by said fibrous face, electrical light-emitting means positioned within each of the housings, and power means electrically connected to said light-emitting means of said illuminable modular floor covering units so that when said light-emitting means are energized by said power means visually discernable pathways are defined in the floor by the cooperation of said illuminable modular floor covering units which can then be followed by the attendees of the conference to the respective conference rooms in the building.

20. In combination with a building such as a hotel having a plurality of guest rooms arranged along a hallway therein and wherein an emergency exit is located nearby along the hallway, an apparatus for guiding the guests in a path of travel from their rooms along said hallway to said emergency exit, comprising a plurality of abuttingly arranged modular floor covering units covering the floor of the hallway, each of said modular floor covering units having a fibrous face, some of said modular floor covering units being illuminable and arranged in a predetermined pattern resting upon the floor and extending along the hallway to said emergency exit, each of said illuminable floor covering units having at least one relatively small opening therein spaced inwardly from the side of said unit and open to the upper surface of the unit, a relatively small light transmissive housing positioned in each of said openings so as to be inset therein and completely surrounded by said fibrous face, light-emitting means positioned within each of the housings, and power means electrically connected to said light-emitting means of said illuminable modular floor covering units so that when said light-emitting means are energized by said power means a visually discernable pathway is defined in the floor by the cooperation of said illuminable modular floor covering units which can then be followed by the guests of the hotel to the nearby emergency exit.

21. In combination with a building such as a hotel having a plurality of guest rooms arranged along opposite sides of a hallway therein, and wherein an emergency exit is positioned nearby along the hallway, an apparatus for guiding the guests of the hotel in a path of travel along the hallway to said nearby emergency exit, comprising a plurality of abuttingly arranged modular floor covering units covering the floor of the hallway at least along opposite sides of the hallway, each of said modular floor covering units having a fibrous face, at least some of said modular floor covering units being illuminable and arranged in a predetermined pattern resting upon the floor and extending along the sides of the hallway to said nearby emergency exit, said illuminable floor covering units being arranged on each side of the hallway so as to be closely adjacent the doors of the guest rooms, each of said illuminable floor covering units have at least one relatively small opening therein spaced inwardly from the sides of said unit and open to the upper surface of the unit, a relatively small light transmissive housing positioned in each of said openings so as to be inset therein and completely surrounded by said fibrous face, electrical light-emitting means positioned within each of the housings, and power means electrically connected to said light-emitting means of said illuminable modular floor covering units so that when said light-emitting means are energized by said power means visually discernable pathways are defined along opposite sides of the hallway by the cooperation of said illuminable modular floor covering units which can then be followed by the guests of the hotel to the nearby emergency exit.

22. Apparatus according to claim 21 wherein said modular floor covering units extending along opposite sides of the hallway are elongate border units having a width of only a fraction of the length thereof.

23. A modular floor covering unit such as a tile having an illuminable electrical lighting apparatus incorporated therein and adapted to serve as a visual directional indicator, said modular unit having a fibrous face and at least one relatively small opening therein spaced inwardly from the sides of said unit and open to the upper surface of the unit, a relatively small light transmissive housing positioned in said opening so as to be inset therein and completely surrounded by said fibrous face and electrical light-emitting means positioned within said housing.

24. A modular floor covering unit such as a carpet tile or carpet border having an illuminable electrical lighting apparatus incorporated therein and adapted to serve when electrically energized as a visual directional indicator, said modular unit having a fibrous face and at least one relatively small opening extending therethrough and spaced inwardly from the sides of said unit and open to the upper surface of the unit, a relatively small light transmissive housing positioned in said opening so as to be inset therein and completely surrounded by said fibrous face, means securing said housing within said opening, and electrical light-emitting means positioned within said housing and wherein said housing is formed of molded plastic having a textured upper surface to diffuse light and thereby be more hidden from view and less noticeable when not illuminated.

25. A modular floor covering unit according to claim 23 or 24 wherein said housing is formed of water impervious material and sealably encases said light-emitting means therein so that the light-emitting means is protected against extraneous material such as spilled liquids.

26. A modular floor covering unit according to claim 23 or 24 wherein said housing is a tinted translucent housing having a predetermined color which serves to camouflage said housing in the floor covering unit.

27. A modular floor covering unit according to claim 23 or 24 wherein said unit comprises a carpet tile having said fibrous face, a primary backing interconnecting the fibrous face, and a secondary backing behind said primary backing and connected thereto for imparting dimensional stability to the unit.

28. A modular floor covering unit according to claim 27 including housing securing means positioned behind said secondary backing and engaging said secondary backing and said housing for securing the inset housing within said opening.

29. A modular floor covering unit according to claim 27 wherein said carpet tile is a tufted carpet having pile yarns forming tufts on the face thereof and having lower portions penetrating said primary backing, said secondary backing engaging the lower portions of the pile tufts penetrating the primary backing and having a thickness substantially greater than the thickness of said primary backing and being formed of resilient plastic material.

30. A modular floor covering unit according to claim 29 wherein said housing extends upwardly no higher than the surrounding pile tufts and wherein said housing is elongate and relatively narrow at least throughout the major portion of the housing and has a widthwise cross-section of no more than about one-half an inch, and wherein said pile tufts are relatively dense so that the pile tufts surrounding said housing receive and aid in spreading the weight of wheeled carts and persons walking across the housing to lessen any likelihood of damage to the housing.

31. A modular floor covering unit according to claim 30 wherein said relatively dense pile tufts are formed of textured yarns each having a plurality of continuous synthetic filaments, and wherein said pile tufts are cut to permit the pile tufts to blossom and expand to provide greater coverage across the face of the tufted carpet and to lessen any appearance of a gap alongside said housing inset therein.

32. A modular floor covering unit having an illuminable electrical lighting apparatus incorporated therein and adapted to serve when electrically energized as a visual directional indicator, said unit comprising a carpet tile having a fibrous face comprised of pile tufts and having at least one relatively small opening extending therethrough and spaced inwardly from the sides of said unit and open to the pile tuft face of the unit, a relatively small light-transmissive housing positioned in said opening so as to be inset therein and completely surrounded by said fibrous face, means securing said housing within said opening, and electrical light-emitting means positioned within said housing, and wherein said housing has beveled upper edge portions which serve to prevent heels of shoes from catching thereon.

33. A modular floor covering unit according to claim 32 wherein said housing is recessed from the surface of said pile tuft face a distance sufficient so that when said pile tuft face is compressed while being walked upon, said housing does not substantially extend above the compressed surface of the pile tuft face.

34. A modular floor covering unit according to claim 32 wherein said pile tufts are cut to permit the pile tufts to blossom and expand to provide greater coverage across the face of the tufted carpet and to lessen any appearance of a gap alongside said housing inset therein.

* * * * *